United States Patent Office 3,445,187
Patented May 20, 1969

3,445,187
PROCESS FOR SEPARATION OF RED MUD FROM DISSOLVED ALUMINA
Frederick J. Sibert, Chicago, Ill., assignor to Nalco Chemical Company, Chicago, Ill., a corporation of Delaware
No Drawing. Filed May 25, 1966, Ser. No. 552,703
The portion of the term of the patent subsequent to July 2, 1985, has been disclaimed
Int. Cl. C01f 7/36
U.S. Cl. 23—143     5 Claims

ABSTRACT OF THE DISCLOSURE

Aqueous suspensions of red mud and dissolved alumina are purified by treating such suspensions with polymers which contain at least 80% of reoccurring moieties such as acrylic acid and its salts.

---

The present invention is concerned with an improved method of alumina manufacture. More specifically, the instant invention relates to an improvement in making alumina via the Bayer process.

The almost universally used process for the manufacture of alumina is the Bayer process. In its broadest aspects, this method is carried out almost exclusively in aqueous solution, and is achieved by reaction of bauxite and a strong base such as caustic soda or lime in steam-heated autoclaves whereby the alumina is transformed into a soluble aluminate form. In this step, a considerable amount of insoluble impurities result or are released from the bauxite, which recrement must be separated from the desired alumina constituent. These residues commonly known as red muds include iron oxides, sodium aluminosilicate, titanium oxide and other materials. Generally these muds appear as very fine particles which are difficult to separate out. Yet the red muds which usually constitute about 5–30% by weight of the ore must be rapidly and cleanly separated from the solubilized alumina liquor. It is important that the excess caustic also be recovered and reused in subsequent runs.

The separation of red mud from alumina and caustic solution is generally effected by first treating the red mud suspension or slurry with chemicals to promote coagulation of solids contained therein. The initial separation is then followed by a washing step. Specifically, the settled solids from the first treatment, normally a 15–20% solids slurry, is washed with hot water. The solids content by this procedure is reduced to about 5–10%. The red mud is usually washed a plurality of times by counter-current techniques. The wash waters containing suspended red mud and dissolved alumina and caustic are then also treated with chemicals to promote settling. In order to make this particular step economically efficient, the chemical must promote rate of separation to a substantial degree. If the rate of separation is too slow, output is materially diminished and overall process efficiency impaired. Likewise, if the separation is not clean, the resultant alumina, in the form of aluminate, is somewhat crude and undesirable for a number of end-uses. The insoluble impurities present in the alumina as carry-through from the manufacturing process tend to add extraneous non-active matter into the specific media, such as water, being treated with aluminate for a variety of purposes. For example, low grade sodium aluminate containing relatively large amounts of mud impurities when used to treat water results in a situation of increased tendency to form slime masses as the direct result of the insoluble impurities present, which masses tend to foul feeding equipment. Also, if the crude sodium aluminate contains substantial amounts of impurities as an admixture, solution problems are quite difficult to overcome if the aluminate is fed in the form of a solid.

In order to overcome the above problems, and materially speed up the separation of red muds from dissolved alumina and caustic via treatment of red mud wash waters, and as well effect a cleaner separation of the constituents, the industry commonly adds starch or starch derivatives at this point in the process. While these materials do aid somewhat in increasing the efficiency of the settling step, the starch additives possess a number of drawbacks. Most important is the fact that relatively large amounts of starch must be employed to obtain satisfactory separation. Yet, required handling of such large quantities of starch is objectionable. Also, use of excessive amounts of starch necessarily results in attendant high organic loading of the clarified liquor with the starch or starch decomposition products. At times the starch additive frequently breaks down into smaller units such as oxalates. These materials are carried through with the alumina liquor and cause problems in further processing of the alumina such as precipitation and scaling of the oxalates upon heat transfer surfaces. It would, therefore, be of benefit to the alumina manufacturing art to increase the speed and efficiency of separation of red mud impurities from the desired aluminate liquor constituent. Particularly, if a chemical substitute for starch could be found, which substitute would be effective at much smaller dosages, such chemical class would find ready acceptance by the alumina-producing industry.

It therefore becomes an object of the invention to provide an improved method of producing alumina.

A specific object of the invention is to effect separation of solubilized alumina from red mud impurities after first treating the red mud with a chemical coagulant, removing a portion of the solubilized alumina, washing the resultant settled solids or sludge with water to produce a red mud washed slurry and further treating the slurry by the method of the invention by addition of specific chemical agents as especially low dosages.

Other objects will appear hereinafter.

In accordance with the invention, an improvement has been discovered in the Bayer process of preparing alumina from bauxite. The Bayer process broadly includes the steps of digesting bauxite in aqueous solution and at elevated temperature, usually under steam pressure with a strongly basic substance to solubilize the alumina contained in the ore. The alumina liquor is partially separated from the water-insoluble impurities of the bauxite ore which are the water-insoluble residues which remain after reaction between the bauxite ore and basic material used to digest the ore. The impurities include materials originally present in the ore as well as insoluble reaction products from the reaction step. The settled solids in form of a thick slurry comprising 15–20% by weight of solids are then further treated by water washing at least once. The resultant diluted slurry, also a slow settling suspension, is then treated with the chemicals of this invention to promote an efficient and clean separation of red mud from dissolved alumina and caustic. The aluminate liquor from this step is then added to the slurry of the digestion step prior to treatment of this slurry with chemical settling aids.

The above-discussed red mud suspension after treatment with water must be efficiently treated to thereby separate out the red muds from the aluminate liquor at a relatively fast rate to make the overall Bayer process efficient. Also, the separation itself should be clean and complete with but minimal amounts of red mud residues remaining as a dispersed phase in the solubilized alumina liquor. In the above-discussed process, the improvement forming the basis of the invention lies in addition of certain organic polymeric substances to the washed red mud suspension containing solubilized alumina and impurities. The polymer treatment substantially enhances the rate of separation of dispersed red mud from dissolved alumina or aluminate salt and excess caustic.

The invention is quite specific with respect to the type of polymer necessary to effect the improved separation rate. It has been determined that the type of ameliorating additive polymer should contain at least 80% or reoccurring moieties selected from either acrylic acid or salts of acrylic acid. Thus, the separation aid may either be a homopolymer comprising polyacrylic acid or salts of polyacrylic acid, or a copolymer, or terpolymer or higher multi-component polymer wherein at least 80% of the polymer structure is made up of acrylic acid or acrylic acid salt groups. The polyacrylate salt may be either an alkali metal, alkaline earth metal or ammonium salt.

Besides the homopolymers of polyacrylic acid or polyacrylate salts, another preferred species is a water-soluble copolymer derived from copolymerization of a monomer mixture containing 80–99% by weight of acrylic acid or acrylate salt, and most preferably, alkali metal acrylate salt and 1–20% by weight of an additional and different monomer comprising an ethylenically unsaturated polymerizable compound containing a hydrophilic group in a side chain attached to the unsaturated hydrocarbon structure.

Particularly useful homopolymers or copolymers of the type described above should have a molecular weight in excess of 50,000, and more preferably in excess of 100,000. Excellent additive polymers have molecular weights even as high as ten million.

A wide variety of one or more different monomers may be copolymerized or terpolymerized in amounts up to about 20% with acrylic acid or salts thereof. Typical comonomers include acrylamide, methacrylamide, acrylonitrile, the lower alkyl esters of acrylic and methacrylic acids, vinyl methyl ether, methacrylic acid salts, maleic anhydride and salts thereof, isopropenyl acetate, itaconic acid, vinyl acetate, alpha-methyl styrene, styrene, fumaric acid, aconitic acid, citraconic acid, amides of any of the foregoing acids, alkali metal derivatives (e.g. sodium, potassium and lithium), alkaline earth metal derivatives (e.g., magnesium, calcium, barium and strontium), and ammonium salts of any of the above monomeric acids or others, the partial alkyl ester amides and salts of various polycarboxylic acids, vinyl toluene, chlorostyrene, vinyl chloride, vinyl formate, ethylene, propylene, isobutylene, etc. Of the just-mentioned comonomers, greatly preferred materials among these contain a hydrophilic group in a side chain off the ethylenically unsaturated hydrocarbon group. Those monomers which do not contain such hydrophilic solubilizing group should be used in lesser amounts of say about 1–5% by weight based on total weight of monomer present.

Still other monomeric substances which may be employed in conjunction with the acrylic acid or acrylic acid salt constituent include materials such as sulfoethyl acrylate, carboxyethyl acrylate, diethyl vinyl phosphonate, crotonic acid or salts thereof, vinyl sulfonate, or salts thereof, vinyl alcohol and vinyl aryl hydrocarbons containing solubilizing groups such as sulfonates, etc.

The homopolymers or multi-component polymers of the invention are utilized by simply adding these adminicles to the washed red mud suspension containing solubilized alumina and red mud residues dispersed throughout the aluminate liquor, in an amount at least sufficient to accelerate the separation of the red mud dispersed solids from the liquid phase. Generally, for best results, at least about 0.001 lb. of chemical per ton of mud residue or insolubles should be employed. More preferably, at least 0.01 lb. of chemical per ton is added to effect rapid separation. Most preferably, 0.05 to about 1.0 lb. of chemical per ton are added. It is understood, that higher amounts than the just-mentioned maximum may be employed without departing from the scope of the invention, although generally a point is reached in which additional amounts of chemical do not improve the separation rate over already achieved maximum rates. Thus, it is uneconomical to the excessive amounts of material when this point is reached.

In order to determine the efficiency of the homopolymers of polyacrylic acid and salts thereof, and copolymers of these materials in materially enhancing rate of separation of washed red mud from valuable aluminate liquor associated with the red mud, the following test procedure was devised. This test method was devised to meet typical industrial conditions particularly with regard to the step wherein previously settled and compacted solids are washed and then treated with chemical to facilitate further separation out of the insolubles.

More particularly, the test procedure was carried out as follows. A Jamaican bauxite was processed via the Bayer method by digestion at 390–400° F. The sodium aluminate liquor contained 33–35% residual insolubles. To 500 ml. of this slurry present in a graduated cylinder and fitted with a regular type stirrer running at 0.9 r.p.m. was added a caustic cooked corn starch, in an amount of 10 pounds per ton of insoluble solids. Addition aided in settling the suspended solids. The temperature of the slurry at time of chemical treatment was 210° F.

The supernatant liquid from the above separation step is decanted from the compacted solids which are present in an amount of about 17 grams per 100 ml. volume. To the compacted solids is added 150 ml. of boiling water. About 9 pounds of rinse water per pound of mud solids is added. The solids are gently stirred to effect redispersion and the chemicals of the invention and other test materials are added at this point. A graduate is inverted for mixing and the time for the solids to resettle to the initial 100 ml. compaction volume is noted as a settling rate.

A number of chemicals of the invention, as well as starch and other polymers were evaluated via the above-outlined test. The following table shows a comparison of results obtained with use of starch and sodium polyacrylate with respect to performance in the above-described test. This particular homopolymer, the homopolymer of the sodium salt of acrylic acid, and various copolymers of acrylic acid or acrylic acid salt showed as high as 40–100 times greater efficiency than starch on an equal dosage basis.

TABLE

| Chemical | Dosage (lbs.) chemical/ton red mud | Time to resettle to 100 ml. volume |
| --- | --- | --- |
| Blank | | 5 mins. 30 secs. |
| Starch | 1 | 4 mins. 30 secs. |
| Do | 3 | 2 mins. 30 secs. |
| Do | 5 | 1 min. 30 secs. |
| Do | 10 | 30 secs. |
| Sodium polyacrylate | .015 | 4 mins. 30 secs. |
| Do | .025 | 3 mins. 30 secs. |
| Do | .050 | 1 min. 30 secs. |
| Do | .25 | 30 secs. |

It was surprising to note that a wide variety of polymers other than the above-described material, both addition-type polymers and interpolymers had little or no activity in enhancing separation rate of red mud residue from aluminate liquor. The following substances had no greater activity than the blank run involving no chemical addition: high molecular weight polyacrylamide, low molecular weight polystyrene sulfonic acid, carboxymethyl cellulose, 50–50 by weight copolymer of sodium acrylate and acrylamide, polyamine prepared from condensation of ammonia and ethylene dichloride, a methyl quaternary of above polyamine and copolymer of acrylamine and dimethyl (amino) ethyl methacrylate.

It is understood, of course, that mixtures of different homopolymers and copolymers of the invention as defined above, may be employed with equal success. Likewise, the materials may be added along with the successful polymers. These auxiliary chemicals may be added as dispersing aids, extenders antifoamers, etc. It is preferred that the polymers and interpolymers of the invention be added in form of aqueous solutions in order to insure ready dissolution of the additive to the washed suspended red mud slurry.

By the term "polymer" is meant to include homopolymers, copolymers and interpolymers of acrylic acid or acrylate salts according to the previously defined limits of the invention.

The invention is hereby claimed as follows:

1. In the Bayer process of preparing alumina from bauxite which comprises the steps of digesting said bauxite in caustic aqueous solution and at elevated temperatures to solubilize said alumina, separating out a portion of said alumina from the insoluble impurities of said bauxite, said impurities consisting of water-insoluble residues remaining after reaction between said bauxite and said base, which residues are commonly called red mud, washing said red mud with water to produce a suspension of red mud and dissolved alumina, an effecting further separation of said dissolved alumina from said red mud; the improvement which comprises effecting said further separation of said red mud from said dissolved alumina at an increased rate and with increased efficiency by addition to said suspension from 0.001 to 1 pound per ton based on the weight of said impurities of a polymer having a molecular weight of at least 50,000 containing at least 80% of reoccurring moieties selected from the group consisting of acrylic acid and salts thereof.

2. The process of claim 1 wherein said polymer is a homopolymer selected from the group consisting of polyacrylic acid and salts thereof.

3. The process of claim 1 wherein said polymer is a water-soluble copolymer derived from copolymerizing 80–99% by weight of an alkali metal acrylate and 1–20% by weight of an additional and different monomer comprising an ethylenically unsaturated polymerizable compound containing a hydrophilic group in a side chain.

4. The process of claim 3 wherein said copolymer is derived from copolymerization of sodium acrylate and acrylamide.

5. The process of claim 1 wherein said steps of washing and separation by means of polymer addition are sequentially repeated at least once.

References Cited

UNITED STATES PATENTS

| | | | |
|---|---|---|---|
| 3,095,282 | 6/1963 | Wilson | 23—312 |
| 3,390,959 | 7/1968 | Sibert | 23—143 |

OSCAR R. VERTIZ, *Primary Examiner.*

U.S. Cl. X.R.

23—52; 210—54